(12) United States Patent
Janisiow

(10) Patent No.: US 11,484,006 B2
(45) Date of Patent: Nov. 1, 2022

(54) ANIMAL FEEDING DEVICE, A FOOD CONTAINER TO BE HOUSED THEREIN, AND A MILKING SYSTEM INCLUDING SUCH A FEEDING DEVICE

(71) Applicant: DELAVAL HOLDING AB, Tumba (SE)

(72) Inventor: Marcin Janisiow, Tumba (SE)

(73) Assignee: DeLaval Holding AB, Tumba (SE)

( * ) Notice: Subject to any disclaimer, the term of this patent is extended or adjusted under 35 U.S.C. 154(b) by 492 days.

(21) Appl. No.: 16/474,473

(22) PCT Filed: Dec. 22, 2017

(86) PCT No.: PCT/EP2017/084437
§ 371 (c)(1),
(2) Date: Jun. 27, 2019

(87) PCT Pub. No.: WO2018/122178
PCT Pub. Date: Jul. 5, 2018

(65) Prior Publication Data
US 2019/0343069 A1    Nov. 14, 2019

(30) Foreign Application Priority Data

Dec. 27, 2016  (SE) .................................... 1651744-3

(51) Int. Cl.
*A01K 1/10* (2006.01)
*A01K 1/12* (2006.01)
*A01K 5/02* (2006.01)

(52) U.S. Cl.
CPC .............. *A01K 1/10* (2013.01); *A01K 1/126* (2013.01); *A01K 5/0225* (2013.01)

(58) Field of Classification Search
CPC ......... A01K 1/10; A01K 1/126; A01K 5/0225
(Continued)

(56) References Cited

U.S. PATENT DOCUMENTS 2,661,720 A * 12/1953 Rysdon .................. A01K 5/025
                                                      119/53
3,115,117 A * 12/1963 Brelsford ............. A01K 5/0275
                                                      119/56.2
(Continued)

FOREIGN PATENT DOCUMENTS

BE        890766 A     2/1982
EP       3047728 A1    7/2016
(Continued)

OTHER PUBLICATIONS https://www.katom.com/131-C2S1699456.html (Year: 2014).*
(Continued)

*Primary Examiner* — Timothy D Collins
*Assistant Examiner* — Maria E Graber
(74) *Attorney, Agent, or Firm* — Nixon & Vanderhye

(57) ABSTRACT

An animal feeding device is provided including at least one cassette including a frame including wall elements defining upper and lower compartments, side wall elements defining a width of the upper compartment, a food container housed in the upper compartment, supported by at least one wall element, and a food delivery device housed in the lower compartment. The food container communicates with the food delivery device through an opening provided in a bottom portion of the food container. The food container has front, end, and side walls. The side walls are parallel in a longitudinal direction, have a constant distance therebetween in the longitudinal direction, are opposite to each other, are connected to and separated by the front wall in one end, and are connected to and separated by the end wall in an opposite end. The end wall has an inclination towards the bottom portion of the food container.

24 Claims, 12 Drawing Sheets

(58) Field of Classification Search
USPC .................................................. 119/14.18
See application file for complete search history.

(56) References Cited

U.S. PATENT DOCUMENTS

| | | | | | |
|---|---|---|---|---|---|
| 4,343,262 | A | * | 8/1982 | Hunziker, Jr. | ....... A01K 1/0356 119/52.4 |
| 4,382,423 | A | * | 5/1983 | Dugan | ................... A01K 61/59 119/211 |
| 4,672,917 | A | * | 6/1987 | Fox | .......................... A01K 5/02 119/57.1 |
| 5,749,315 | A | * | 5/1998 | Barenwald | ............... A01K 5/01 119/52.1 |
| 7,175,103 | B1 | * | 2/2007 | Barley | ................. A01K 5/0225 119/51.04 |
| 2005/0076840 | A1 | * | 4/2005 | Van Den Berg | ........ A01J 5/017 119/14.04 |
| 2008/0184938 | A1 | * | 8/2008 | Lipscomb | ................ A01K 5/01 119/51.03 |
| 2013/0104807 | A1 | * | 5/2013 | Barley | ..................... F16B 1/00 403/42 |
| 2015/0208608 | A1 | * | 7/2015 | Brummel | ................. A01K 5/01 119/14.04 |
| 2019/0230900 | A1 | * | 8/2019 | Camara Leal De Oliveira Tognato | ............... A01K 5/0291 |

FOREIGN PATENT DOCUMENTS

| | | | | |
|---|---|---|---|---|
| FR | 2859876 A1 | * | 3/2005 | ........... A01K 5/0275 |
| FR | 2859876 A1 | | 3/2005 | |
| FR | 2947986 A1 | * | 1/2011 | ........... A01K 5/0225 |
| FR | 2947986 A1 | | 1/2011 | |
| WO | 02/11523 A1 | | 2/2002 | |
| WO | 2012/078680 A1 | | 6/2012 | |
| WO | WO-2012078680 A1 | * | 6/2012 | ............... A01K 5/02 |
| WO | WO-2018000065 A1 | * | 1/2018 | ............... A01K 5/02 |

OTHER PUBLICATIONS

Crathco Juice Dispenser, sold online by KaTom (https://www.katom.com/131-C2S1699455.html) (Year: 2014).*
International Search Report and Written Opinion, dated Apr. 3, 2018, from corresponding PCT application No. PCT/EP2017/084437.
Swedish Search Report, dated Sep. 20, 2017, from corresponding SE application No. 1651744-3.

* cited by examiner

ANIMAL FEEDING DEVICE, A FOOD CONTAINER TO BE HOUSED THEREIN, AND A MILKING SYSTEM INCLUDING SUCH A FEEDING DEVICE

TECHNICAL FIELD

The present invention relates to an animal feeding device, comprising at least one cassette that comprises a frame that comprises wall elements that define an upper compartment and a lower compartment of the frame, a food container housed in the upper compartment of the frame and supported by at least one wall element of the frame, and a food delivery device housed in the lower compartment of the frame, wherein said food container communicates with said food delivery device through an opening provided in a bottom portion of the food container, and wherein the frame has side wall elements that define a width of the upper compartment.

The present invention also relates to a food container of a feeding device arranged to the feed animals, said food container comprising a top provided with a food inlet for introduction of food into the container, and a bottom portion provided with a food outlet.

The present invention also relates to an animal milking system, comprising at least one milking device configured to milk an animal, a food manger and an animal feeding device configured to fill the food manger with food.

BACKGROUND ART

Milking systems for milking of animals at an industrial scale may comprise combined set ups of milking devices together with animal feeding devices. The milking devices may be configured to provide for automatic milking of animals, typically cows, which enter the operation area of such a milking device. There are numerous different milking device designs known to the person skilled in the art. Normally, the milking device is configured to enable the animal to enter the operation area of the milking device by its own choice, and milking to be performed automatically until a predetermined milking rate is achieved. The animal is then triggered to leave the operation area of the milking device and give room to the next animal to enter the area.

In close proximity to such a milking device there may be provided an animal feeding device. The animal feeding device may be configured so as to provide a predetermined, individualized, mix of food and nutrients to the animal that is being milked by the milking device. The animal is assumed to eat while being milked. Accordingly, the milking system may comprise identification means to identify which animal is being milked, and control means that control the operation of an animal feeding device will ensure that the animal feeding device delivers the right amount and mix of food and nutrients to the identified animal. Thereby, the identification means and control means may be connected to or include a data base in which information regarding the amount of food and nutrients to be delivered to each individual animal is gathered. The animal feeding device may include a number of containers in which different sorts of food and nutrients are kept and from which a food delivery device receives the food and nutrients aimed for the animal that is being milked and delivers it to a manger that is within reach of the animal that is being milked. The animal feeding device, including containers and food delivery devices, may be positioned above the manger, suspended by or lifted by some kind of lifting device or suspension device.

Less ambitious solutions may, off course, also be applicable, in which the animal feeding device is not so intimately and operatively connected to a milking device, but is more of a free-standing character. However, regardless of the degree of complexity of the milking system, there is a general wish to have an animal feeding system that combines a high degree of efficiency and precision with low weight and low volume, thereby requiring less space and less costly and advanced suspension or lifting devices to hold it in position.

It is therefore an object of the invention to present an animal feeding device that combines efficient functionality in terms of delivery of right amounts of food and/or nutrients with low weight and compactness of the device itself.

It is also an object of the invention to present an animal feeding device that enables uncomplicated exchange of individual parts thereof for purposes such as maintenance and repair, and that can be arranged as a modular system, the size and complexity of which can be tailored to the specific needs of different user conditions.

SUMMARY OF THE INVENTION

The objects of the invention is at least partly achieved by means of the initially defined animal feeding device, which is characterised in that the food container has side walls that are parallel in a longitudinal direction, have a constant distance between them in said longitudinal direction, are opposite to each other and in one end thereof are connected to and separated by a front wall and in an opposite end thereof are connected to and separated by an end wall which, at least along a lower part thereof, has an inclination towards a bottom portion of the food container, and that the distance between the respective outer surface of said side walls of the food container defines a width of the food container, that the side walls of the food container are positioned opposite to and adjacent a respective of said side wall elements of the frame, and that the width of the upper compartment corresponds to the width of the container.

Thereby, a very compact module, comprising a frame and a container and a food delivery device housed therein is obtained. Depending on the needs, two or more such modules can easily be combined and attached to each other to form a more complex and potent animal feeding device. Each individual container has a dedicated frame, and by joining such frames to each other in accordance with the specific needs great versatility is obtained.

The term "wall element" as used herein should be regarded in a wide sense. A wall element may, for example, include a beam of a frame or a more wall-like element that covers more or less of a side of the frame. A wall element may also include any element that forms part of the frame and contributes to the definition and delimitation of the upper and lower compartment of the frame. The terms "upper" and "lower" as used herein refer to positions identified when the cassette is in its assumed operative position. The "longitudinal direction" in which the distance between the side walls of the container is constant may be the vertical direction or the horizontal direction. Preferably, the distance between the side walls is constant in both the vertical and horizontal direction, wherein the side walls of the container are generally flat and parallel with each other. The container is defined as having a height in the vertical direction and a length in a horizontal direction when regarded in its operative position inside the frame. The food delivery device may be any kind of suitable device able of receiving food or nutrients from a container above it and to displace that food or nutrients in a controlled manner, i.e. controlled amount and rate, to a manger. A device comprising a feeding screw in a tube or box may be used and may be referred to as an auger. Other devices may be used to dispense food such as a belt conveyor or similar devices. Preferably, there are provided load sensors or other suitable means for measuring amount of delivered food in connection to the container, wherein the operation of the food delivery device is based on quantity of delivered food measured by means of such load sensors or means. When, during dispensing of food, the load sensor or sensors has/have detected a predetermined reduction of load in the container, corresponding to the predetermined amount to be dispensed to a predetermined animal, the food delivery sensor is controlled to stop its operation. For this purpose the animal feeding device preferably includes or is connected to a control unit that controls the operation of the food delivery device on basis of data regarding how much food that is to be served to a predetermined animal and on basis of the information from the load sensor or sensors. It is to be noted that to control the amount of food to be dispenses other alternatives than load sensors are possible to use such as running time of the motor that is connected to the auger, belt conveyor or similar device. The animal feeding device thereby also preferably comprises or is connected to a data base that contains data regarding the amount of food or nutrients to be delivered to predetermined animals, and an animal identification system or device that identifies the animal that is to be served with food or nutrients by the animal feeding device. Preferably, the manger is located in connection to a milking device to enable the animal to eat from the manger while being milked, and the animal identification device is an identification device used for identifying which animal that is being milked. Preferably, the identification device is arranged so as to identify which animal that enters a predetermined milking area, and this identification triggers the animal feeding device to start a feeding sequence or operation.

According to one embodiment, the height of the upper compartment corresponds to the height of the food container. Thereby, there is no unnecessary spacing in the upper compartment of the frame, adding to the compactness of the cassette.

According to one embodiment, the outer surface of said side walls of the container are in contact with the side wall elements of the frame, such that the container is held in position in the frame at least partly as a result of a friction force between said side walls and said side wall elements. Thereby, great lateral stability of the container is obtained and the stability of the position of the container is provided by structural members of the frame that defined the extension of the sides of the frame.

According to one embodiment, in a front end of the frame, the wall elements of the frame define a lateral opening into the upper compartment, said lateral opening having a width corresponding to the width of the upper compartment and a height equal to or larger than the height of the food container, said lateral opening being configured to enable entrance and exit through said lateral opening of the container into and out of the upper compartment respectively. Thereby, the container can easily be temporarily taken out of the frame and/or replaced upon need thereof. The direction in which the container is moved into or out of the frame may be generally horizontal due to this design feature, thereby eliminating or reducing the need of lifting the container in connection to such displacement thereof.

According to one embodiment, the lower compartment has a width equal to the width of the upper compartment. The width should be equal in the vertical as well as in the horizontal direction. Thereby, the cross-sectional peripheral shape of the cassette in any horizontal plane thereof is square, contributing to geometry of the cassette that promotes efficient close-packing of plural cassettes side by side.

According to one embodiment, wall elements of the frame define a lateral opening into the lower compartment, which is configured to enable entrance and exit of the food delivery device into and out of the lower compartment respectively. Thereby, the food delivery device can easily be temporarily taken out of the frame and/or replaced upon need thereof. The direction in which the food delivery device is moved into or out of the frame may be generally horizontal due to this design feature, thereby eliminating or reducing the need of lifting the food delivery device in connection to such displacement thereof.

According to one embodiment, said lateral opening into the upper compartment and the lateral opening into the lower compartment are provided on a same side of the frame. Thereby, a plurality of cassettes may be joined side by side, and front end against front end, such that only one side of at least some of the cassettes is exposed, while it will still be possible to remove or replace both the container and the food delivery device of each of the cassettes without having to separate the cassettes from each other. And, the motion is a horizontal motion that does not require lifting of the container or the food delivery device (once taken out of the frame, the container and the food delivery device may though need to be lifted).

According to one embodiment, the food delivery device is configured to receive food from an outlet provided in a bottom portion of the container and deliver that food to a further downstream food collector positioned below the food delivery device, and that the food delivery device defines a food delivery path which has an inclination angle of between 5° and 45°, preferably 5°-20°, relative, a horizontal plane from where it receives food from the container to where it delivers food to the food collector. The food delivery device is thus configured to receive food from the container and displace the food along path that has a slightly upward inclination relative a horizontal plane. Preferably, the food delivery device delivers the food to the food collector by dropping the food down into the latter. A plurality of cassettes may be connected to one and the same food collector. Upon a signal, that may be based on measurement of amount (weight) of food that has been delivered from a container to a food delivery device associated thereto, and/or the amount of food that has been received by the food collector, the food delivery device is stopped, and no further food is delivered therefrom to the food collector. By providing inclined path of the food delivery device, the after run time during which food is still delivered by food delivery device after generation of said signal, may be reduced, thereby contributing to higher precision. This may be particularly helpful and advantageous when the food consists of small amounts of added nutrients or the like, for which it is crucial that the delivered weight/amount is very accurate.

According to one embodiment, the frame comprises first support surfaces by which the container is supported. According to one embodiment, the frame comprises guide elements that enable the container to be slid into the upper compartment to a position in which it is supported by said support surfaces. The guide elements may comprise a structural member that extends a distance above any of the support surfaces and defines a gap between itself and the adjacent support surface. Preferably, the container has engagement means that fit into said gap such that the container is guided by the guide elements while being introduced into or removed from the upper compartment of the frame. Said engagement means may, according to one embodiment, include a flange extending laterally from the rim of the bottom portion of the container.

According to one embodiment, the frame comprises second support surfaces by which the food delivery device is supported. According to one embodiment, the frame comprises second guide elements that enable the food delivery device to be slid into the upper compartment to a position in which it is supported by said second support surfaces. According to one embodiment, the guide element comprises a structural member that defines a gap between itself and the second support surfaces. Preferably, the food delivery device has engagement means that fit into said gap such that the food delivery device is guided by the second guide means while being introduced into or removed from the lower compartment of the frame.

According to one embodiment, the animal feeding device comprises a plurality of cassettes that are releasably attached to each other. The cassettes may preferably be provided with a quick lock joint, such as snap fit joints, by means of which one cassette is joined with another one. Preferably, the joints are located on the frame at the sides thereof that correspond to the side walls of the container, to enable easy joining of the cassettes side by side.

According to one embodiment, the animal feeding device comprises a platform on which the at least one cassette stands, and a lifting arrangement that holds the platform with the at least one cassette at a predetermined height above ground. The lifting arrangement may be a bridge, a post, or a wire arrangement attached to an above-positioned structural member of a building.

According to one embodiment, there is provided a slidably arranged element that covers the opening provided at the bottom portion of the container when the food delivery device is out of operative position and that is pushed away from that covering position by the food delivery device when the latter is slid into its operative position inside the lower compartment and that automatically returns to the covering position upon removal of the food delivery device from its operative position in the lower compartment. Automatic return of said element may be obtained in many ways. For example, said element may be spring-loaded in order to return to a stable position in which it covers said opening. By the provision of said element, removal of the food delivery device is enabled with a minimum of loss of food caused by leakage through said opening.

The object of the invention is also at least partly achieved by means of a food container of a feeding device arranged to feed animals, said food container comprising a top provided with a food inlet for introduction of food into the container, and a bottom portion provided with a food outlet, said food container being characterised in that the food container has side walls that are parallel in a longitudinal direction, have a constant distance between them in said longitudinal direction, are opposite to each other and in one end thereof are connected to and separated from each other by a front wall and in an opposite end thereof are connected to and separated from each other by an end wall that, at least along a lower part thereof, has an inclination towards the bottom portion of the food container. The inclination of the inclined part of the end wall is a matter of choice depending on the flow characteristics of the food or nutrient that is to be housed in the container. The more fluid the food is, the lower inclination relative a horizontal line can be accepted, since the food will then still be able of flowing towards the outlet at the bottom portion. The outlet is defined by a rim that circumscribes and thereby defines an opening at the bottom portion. The outlet/opening is located closer to the front wall than to the end wall. According to one embodiment, the outlet/opening is located in direct connection to the front wall, a front portion of the bottom portion being an extension of the front wall of the container and said rim being the lower end thereof.

According to one embodiment, the parallel side walls are generally flat, and the front wall is generally flat and perpendicular to the side walls.

According to one embodiment, the bottom portion extends from lower ends of the side walls, the front wall and the end wall to a bottom rim portion which delimits the opening of the bottom portion. The bottom portion has an extension in the vertical direction which is only a fraction of the height of the container. Accordingly, the height of the bottom portion is less than 25% of the total height of the container, preferably less than 20% of the total height of the container. The bottom portion may have inclined outer surfaces towards said rim, at least as seen from the side walls of the container.

According to one embodiment, at the bottom portion of the container, the container has engagement means configured to be engaged with a guide element of a frame configured to house the container. According to one embodiment, said engagement means comprises a flange extending laterally from the rim that defines the outlet/opening in the bottom portion. The engagement means is assumed to engage with guide elements as described hereinabove with reference to the animal feeding system in which the container preferably is included.

According to one embodiment, the container has a width w, which is said distance between the side walls thereof, and a maximum height h, as seen from top to bottom, wherein $0.1h<w<0.5h$.

According to one embodiment, the container has a width w, which is said distance between the side walls thereof, and a maximum length l, as seen from front wall to end wall, wherein $0.1l<w<0.5l$. The maximum length of the container is referred to as the largest distance between the front wall and the end wall in a horizontal direction (when the container is in its operative position). According to one embodiment, the maximum length is the length at the top of the container. In the region of the inclined part of the end wall, the length is reduced compared to the maximum length.

According to one embodiment, the inclination angle of said at least lower part of the end wall is in the range of 30°-60°. If the angle is too low, the flow of food through the container may be insufficient, resulting in pockets of food that does not pass through the container. A too large angle has a negative effect on the volume of the container.

According to one embodiment, the bottom portion has a bottom that defines said food outlet and that has an inclination angle in the range of 5°-45°, preferably 5°-20°, relative a plane that is perpendicular to the plane of the front wall and perpendicular to the plane of the side walls of the container. In an operative position of the container, when it is housed in the upper compartment of a frame as described hereinbefore, the inclination angle of the bottom rim, or more precisely of the lower surface thereof, is 5°-45°, preferably 5°-20°, relative to the horizontal plane, sloping downwards from the end wall to the front wall of the container. Preferably, the inclination of said rim, more precisely the lower surface thereof, is the same as the inclination angle of the path of a food delivery device as described hereinabove, located in the lower compartment of the same frame. Thereby, a minimum of leakage and food waste is obtained, and the compactness of a cassette as described hereinabove is promoted.

The present invention also relates to an animal milking system, comprising at least one milking device configured to milk an animal, a food manger and an animal feeding device configured to fill the food manger with food, said animal milking system being characterised in that the animal feeding device is an animal feeding device as described hereinabove or hereinafter.

According to one embodiment, the milking system comprises identification means for identifying an animal that is in a predetermined milking position at the food manger, and a control unit that controls the operation of the food delivery device of the animal feeding device on basis of information from said identification means and information in a data base that contains information of amount and type of food to be served to the animal.

According to one embodiment, the milking system is a rotary parlour.

Further features and advantages of the present invention will be disclosed in the following detailed description of exemplifying embodiments.

BRIEF DESCRIPTION OF THE DRAWINGS

Exemplifying embodiments of the invention will be described more in detail with reference to the enclosed drawing, on which.

DETAILED DESCRIPTION

Figure 1:
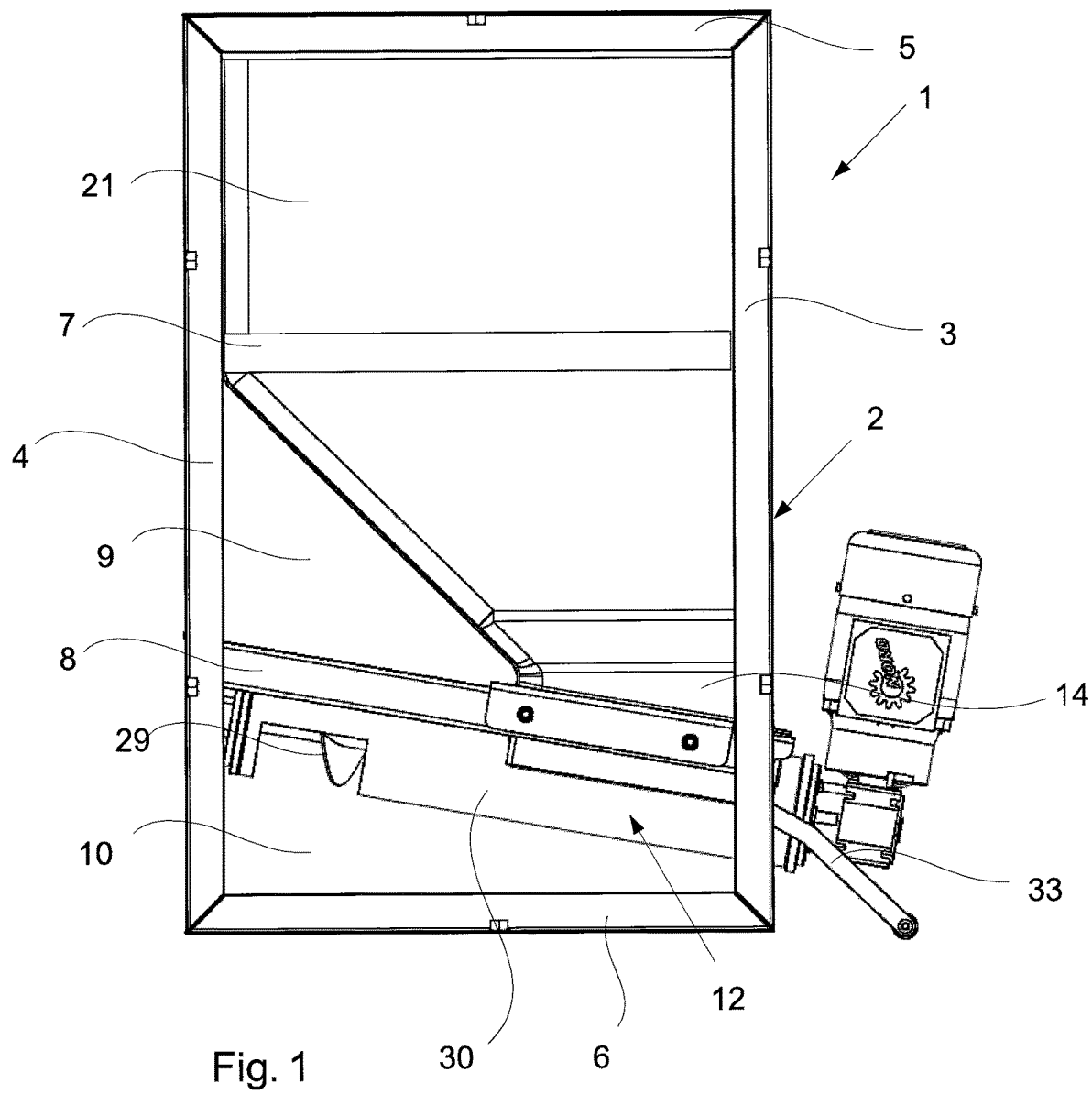
FIG. 1 is a side view of a cassette according to the present invention.
Figure 2:
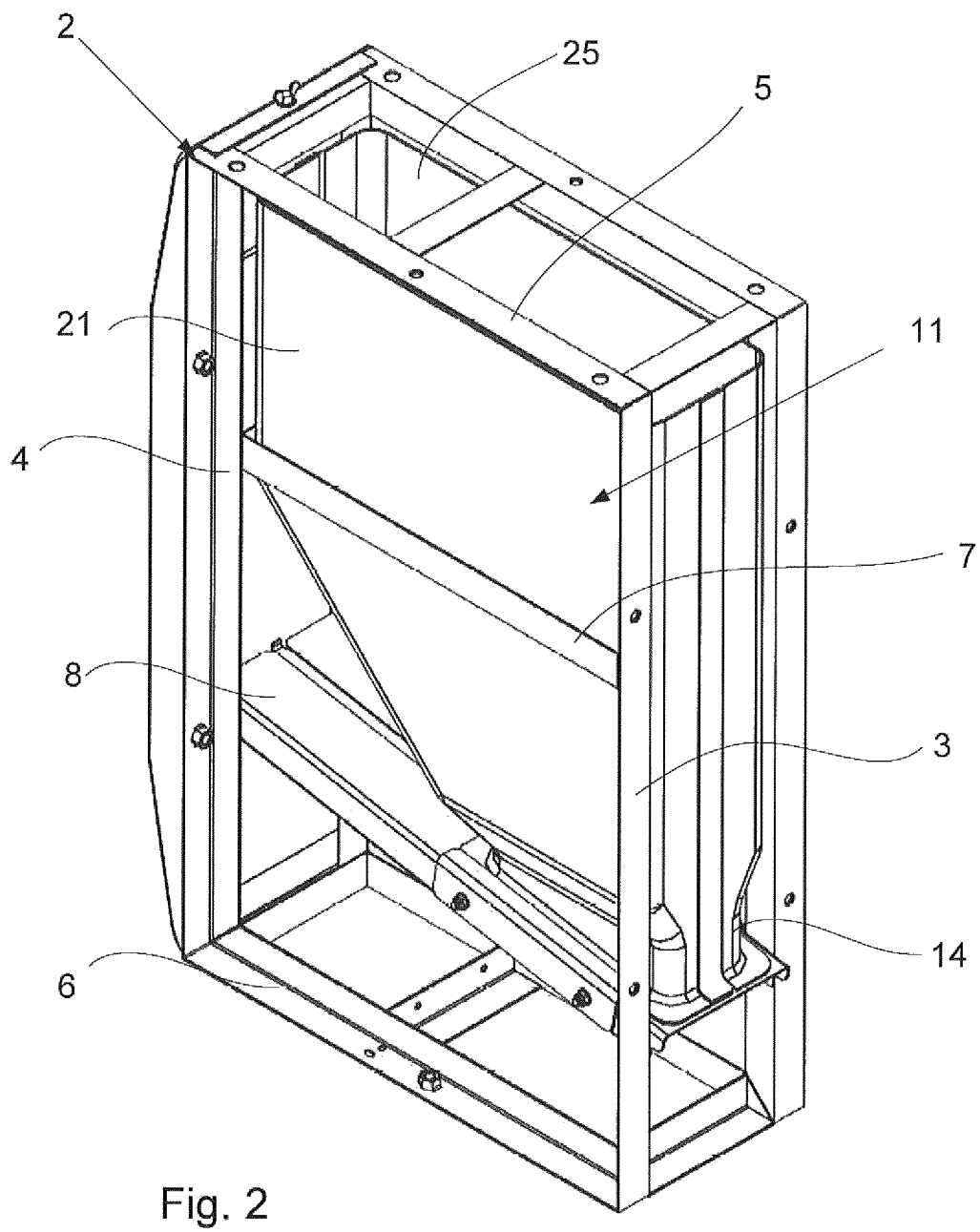
FIG. 2 is a perspective view of a frame and a container according to the present invention.
Figure 11:
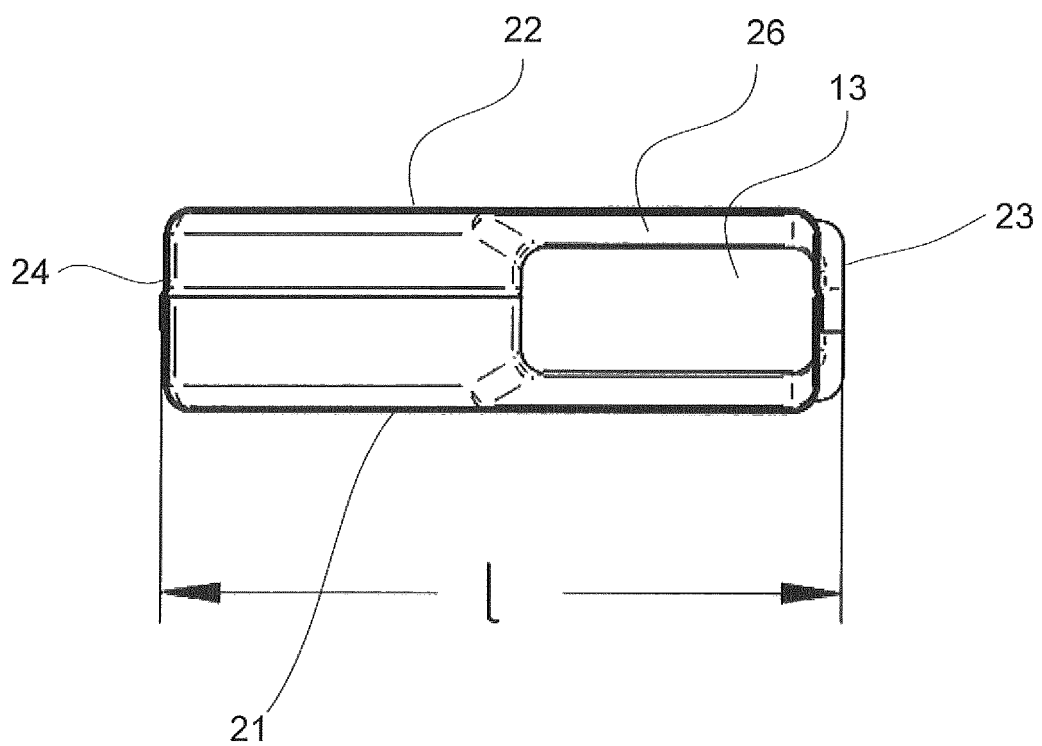
FIG. 11 is a view from below of the container shown in FIGS. 9 and 10.

FIG. 1 is a side view of an animal feeding device according to the present invention, or at least essential parts of such an animal feeding device. The animal feeding device comprises at least one cassette 1 that comprises a frame 2 that comprises wall elements 3-8 that define an upper compartment 9 and a lower compartment 10 of the frame 2. The animal feeding device further comprises a food container 11 housed in the upper compartment 9 of the frame 2 and supported by at least one wall element 8 of the frame 2, and a food delivery device 12 housed in the lower compartment 10 of the frame 2. The food container 11 communicates with said food delivery device 12 through an opening (denoted 13 and shown in FIG. 11) provided in a bottom portion 14 of the food container 11. The frame 2 has side wall elements 3-7 that define a width of the upper compartment 9. Some of these wall elements also define the width of the lower compartment 10.

The frame 2 is designed as a framework, and the side wall elements 3-7 are beams of the framework that define the outer contour of the frame 2. The frame 2 has a box-like contour with six sides that are parallel or perpendicular to each other. One wall element 8 forms a partition wall element between the upper compartment 9 and the lower compartment 10, and has an opening (denoted 15 in FIG. 3) enabling the communication between the food container 11 and the food delivery device 12 through the opening 13 in the bottom portion of the container 11. The partition wall element 8 has an upper surface that define support surfaces 16 for the container 11 and on which the container 11 stands when positioned in the upper compartment 9. The partition wall element 8 is formed by a beam that also presents lower flanges 17 that project into the lower compartment, wherein said flanges 17 define second support surfaces 18 aimed for the food delivery device 12 when the latter is in an operative position in the lower compartment 10. The partition wall element 8 has a linear extension and extends with an inclination angle of 10° from a first lateral side of the frame 2 to a second lateral side thereof. When the cassette 1 stands in an operative position, the inclination angle of the partition wall 8 is 10° in relation to the horizontal plane.

The frame 2 further comprises guide elements 19 that enable the container 11 to be slid into the upper compartment 9 to a position in which it is supported by said support surfaces 16. The guide elements 19 comprise a flange that extends a distance above the support surfaces and defines a gap between itself and the adjacent support surface. The container 11 has engagement means 20 that fit into said gap such that the container is guided by the guide elements 19 while being introduced into or removed from the upper compartment 9 of the frame 2. Here, said engagement means 20 include a flange extending laterally from a rim of the bottom portion 14 of the container 11. The interaction between the engagement means 20 of the container 11 and the support surfaces 16 and the guide elements 19 will contribute to hold the container 11 in a stable position inside the frame. Further engagement of the container 11 may be achieved by provision of snap joints or the like between the container 11 and the frame, but is not indicated here.

The flanges 17 that define the second support surfaces 18 for the food delivery device 12 will, together with a lower surface of the partition wall element 8, form second guide elements for the food delivery device, as a result of a gap being defined between the lower surface of the partition wall element 8 and said flanges 17. The second guide elements enable the food delivery device 12 to be slid into the lower compartment 9 to a position in which it is supported by said second support surfaces 18 (see FIGS. 5 and 6).

Figure 3:
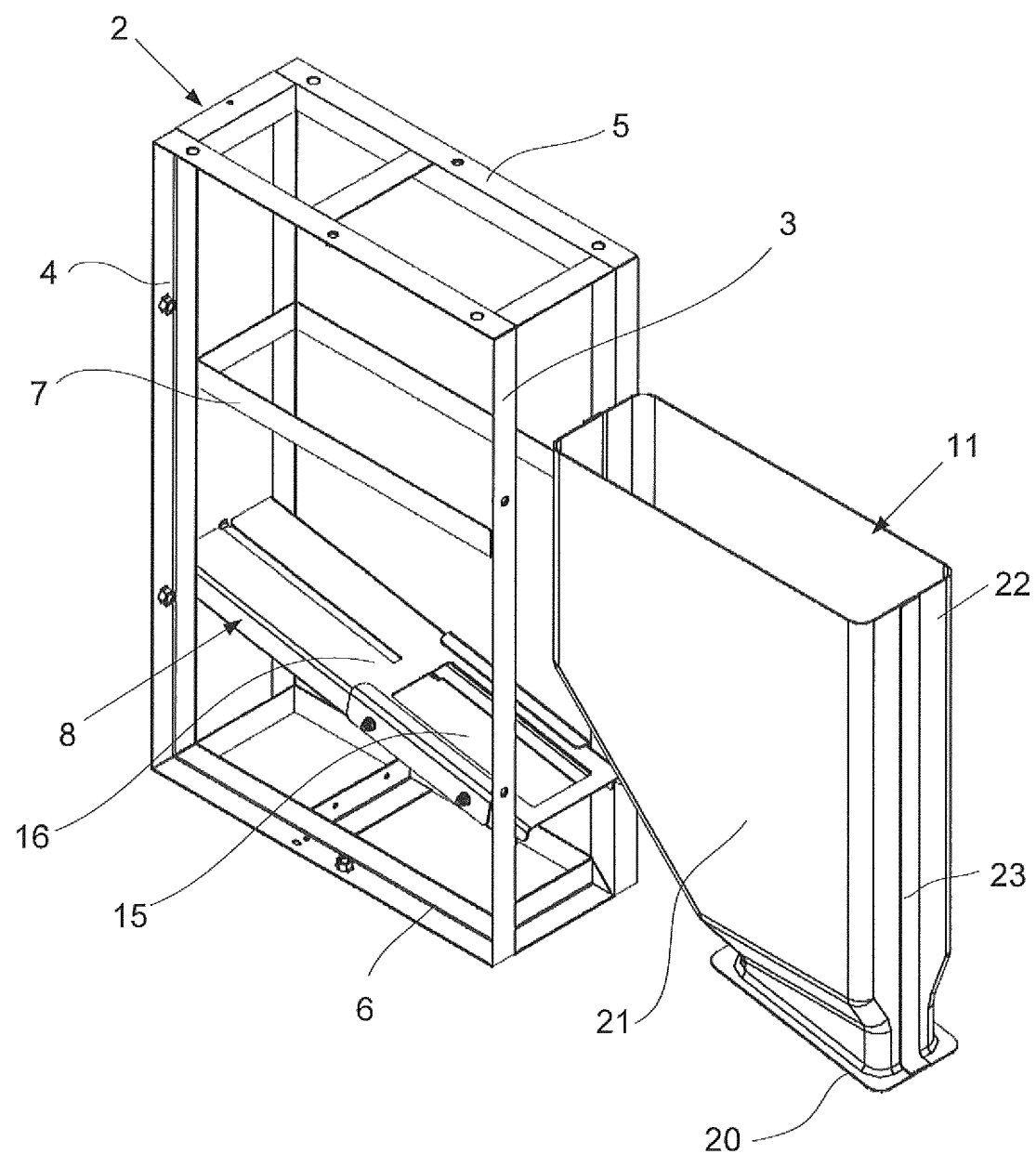
FIG. 3 is a view showing the principle of insertion of a container into the frame to the position shown in FIG. 2.
Figure 4:
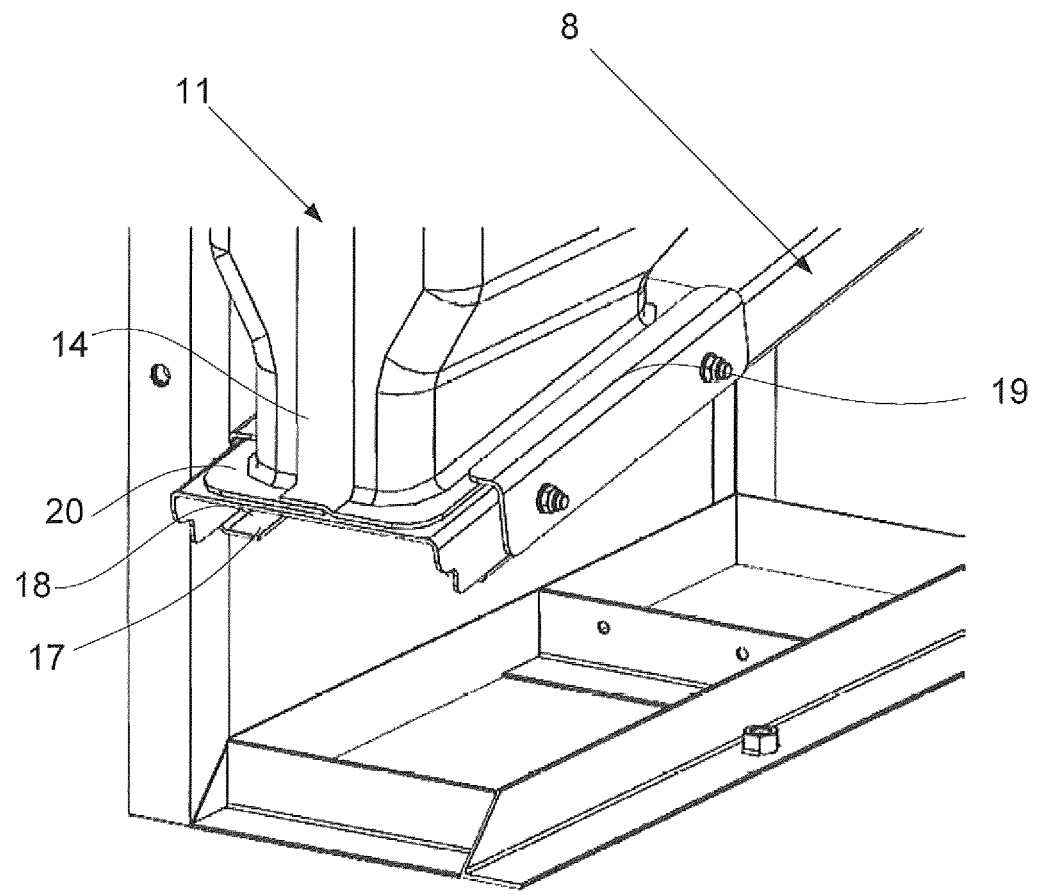
FIG. 4 is a perspective view of a detail of the container shown in FIGS. 1-3.
Figure 5:
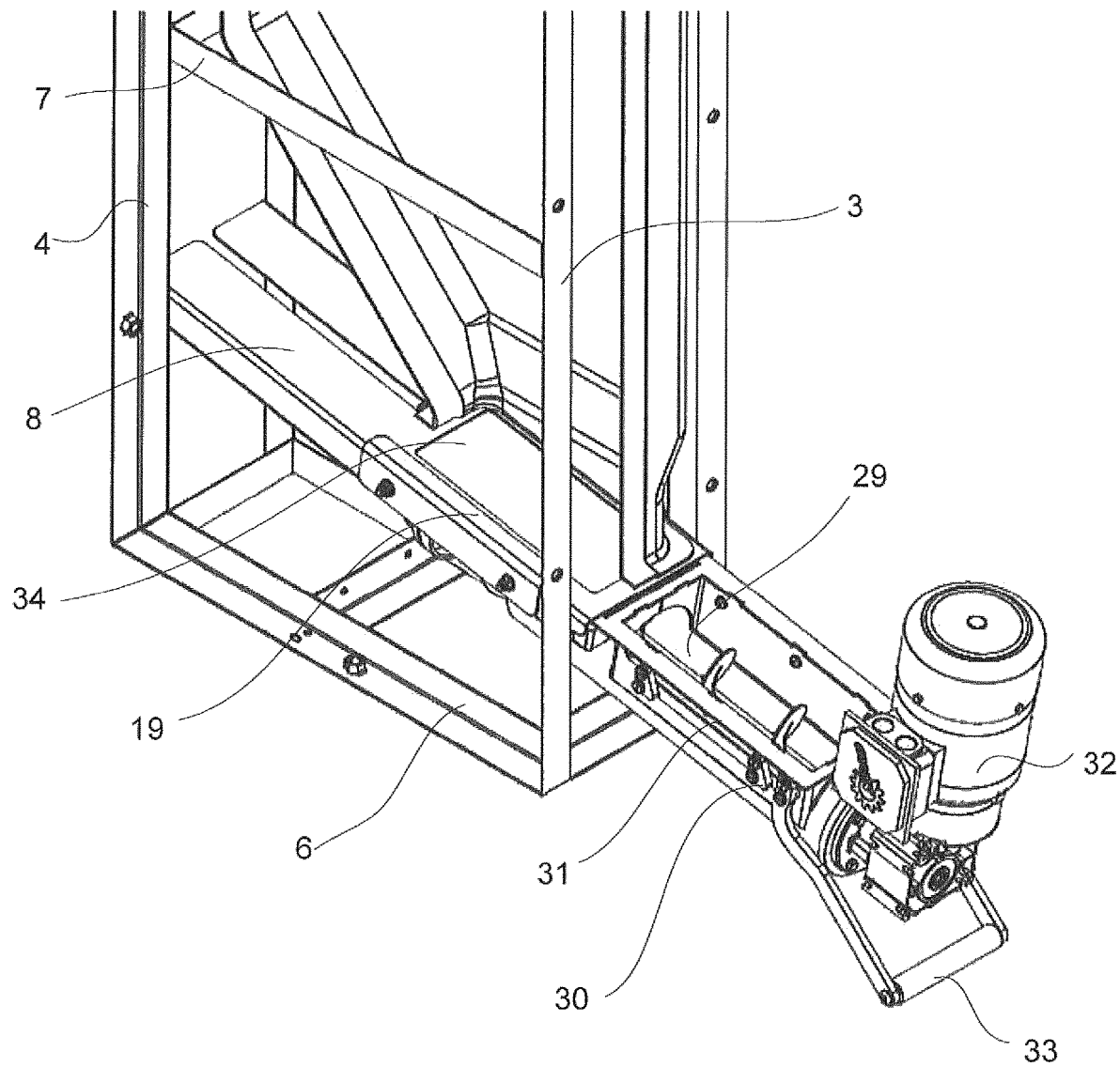
FIG. 5 is a partly cut perspective view showing a food delivery device before insertion into a frame.
Figure 6:
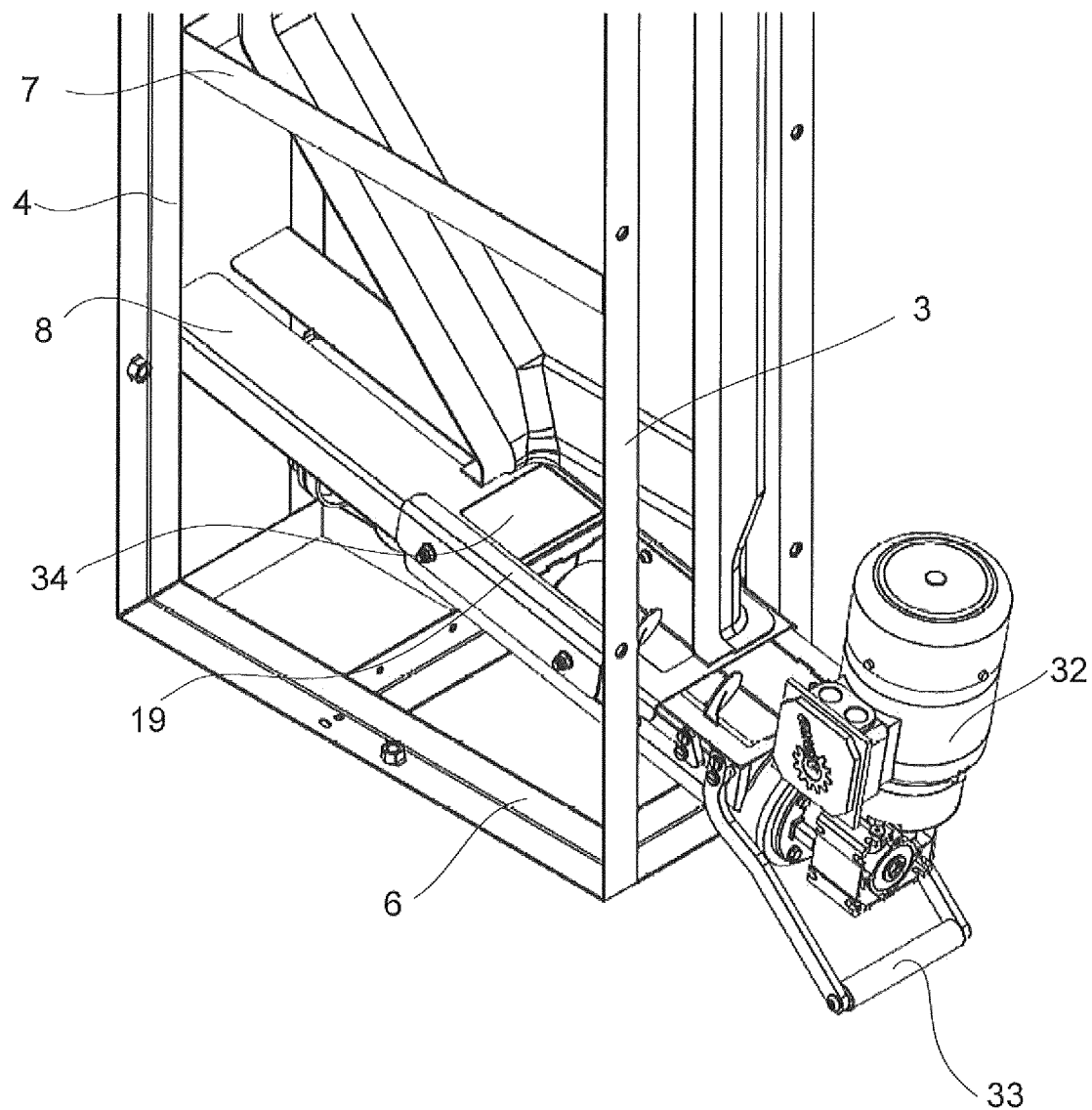
FIG. 6 is a partly cut perspective view showing the principle of insertion of the food delivery device into the frame.

As can be seen in FIGS. 3, 5 and 6 there are openings defined in one and the same side of the frame 2 through which the container 11 may enter into its operative position inside the upper compartment 9 and the food delivery device 12 may enter into its operative position inside the lower compartment 10.

The design of the food container 11 will now be disclosed more in detail. The food container 11 has side walls 21, 22 that are parallel and flat. Thus, the side walls, have a constant distance between them in the both the vertical and the horizontal direction (when the food container is in its operative position inside the frame) and are opposite to each other. In one end thereof, the side walls 21, 22 are connected to and separated from each other by a front wall 23. In an opposite end thereof they are connected to and separated from each other by an end wall 24 which, along a lower part thereof, has an inclination towards the bottom portion 14 of the food container 11. The front wall 23 is generally flat and perpendicular to the side walls 21, 22. In the operative position of the container 11, the front wall extends in a vertical plane. An upper part of the end wall 24 is parallel to the front wall. The lower part of the end wall 24 has inclination angle of approximately 45° in relation to the upper part of the end wall 24 and to a vertical plane when in its operative position inside the frame 2. The inclination angle may be adapted to the flow characteristics of the food to be housed in the container 11. The distance between the respective outer surfaces of said side walls 21, 22 of the food container 11 defines a width w of the food container 11. The side walls 21, 22 of the food container 11 are positioned opposite to and adjacent a respective of said side wall elements 3-7 of the frame 2. The width of the upper compartment 9 corresponds to the width w of the container 11. In its operative position, the outer surface of said side walls 21, 22 of the container 11 are in contact with the side wall elements 3-7 of the frame 2, such that the container 11 is held in position in the frame 2 at least partly as a result of a friction force between said side walls 21, 22 and said side wall elements 3-7.

The food container 11 has a top provided with a food inlet 25 for introduction of food into the container, and said bottom portion 14 provided with a food outlet, embodied by said opening 13. The bottom portion 14 extends from lower ends of the side walls 21, 22, the front wall 23 and the end wall 24 to a bottom rim 26 which delimits the opening 13 of the bottom portion 14. From the bottom rim 26 the previously described flange 20 extends laterally to form an engagement means for engagement with the previously described guide elements 19 of the frame 2.

The container 11 has a maximum height h wherein, in this embodiment w=0.25h. The food container 11 has maximum length l, as seen from front wall 23 to end wall 24 wherein, in this embodiment, w=0.3l. The bottom portion has inclined side walls, such that the container 11 has a tapering cross section from the lower end of the parallel side walls 21, 22 to the bottom rim 26. The bottom portion 14 has a height which is only approximately 5-10% of the total height h of the container 11. The rim 26 has a lower surface that has an inclination angle which is equal to the inclination angle of the partition wall element 8, and relative a plane that is perpendicular to the plane of the front wall 23 and perpendicular to the plane of the side walls 21, 22 of the container 11. The container 11 may, preferably, be made of polymer or metal, preferably stainless steel.

The food delivery device 12 will now be described more in detail. The food delivery device 12 is configured to receive food from the opening 13 in the bottom portion 14 of the container 11, and to feed the food forward to a collector (denoted 27 in FIG. 7) from which the food is permitted to drop down into a manger (denoted 28 in FIG. 8). In this embodiment the food delivery device 14 comprises an screw 29 (sometimes also referred to as an auger) provided in a box 30 wherein the box 30 has a first opening that, when the food delivery device 12 is in its operative position, will face the opening 13 of the container 11, and a second opening in an end thereof to which the food will be fed by the action of the screw 29. The box 30 has upper lateral flanges 31 which are configured to engage the above-mentioned second guide elements and be supported by the second support surfaces 18 of the frame 2, thereby allowing the food delivery device 12 to be slid into its operative position in the frame 2 through a front opening in the latter. The food delivery device 12 further comprises a motor 32 for driving the screw 29, the motor being arranged at an opposite end of said box 30 relative said second opening therein. In the operative position of the food delivery device 12 inside the frame 2 the motor 32 is positioned on the outside of the frame 2. Furthermore there are provided locking means 33 for quick-locking the food delivery device 12 in its operative position. These are not described further here. In its operative position, the food delivery device 12 will define a path along which it forwards food. In this embodiment, the path has an inclination of approximately 10° in relation to the horizontal axis in order to reduce after-run time.

In connection to the food delivery device there is also provided a slidably arranged element 34 that covers the opening 13 provided at the bottom portion 14 of the container 11 when the food delivery device 12 is out of operative position and that is pushed away from that covering position by the food delivery device 12 when the latter is slid into its operative position inside the lower compartment 10 and that automatically returns to the covering position upon removal of the food delivery device 12 from its operative position in the lower compartment 10. Here, the element 34 is formed by a plate that is slidably arranged along the lower surface of the partition wall element 8 and that has a snap fitting connection to the box 30 of the food delivery device 12, such that the box 30 can be connected to the plate when the food delivery device 12 is to enter the lower compartment 10 and be disconnected therefrom when it is to be removed from the lower compartment 10.

Figure 7:
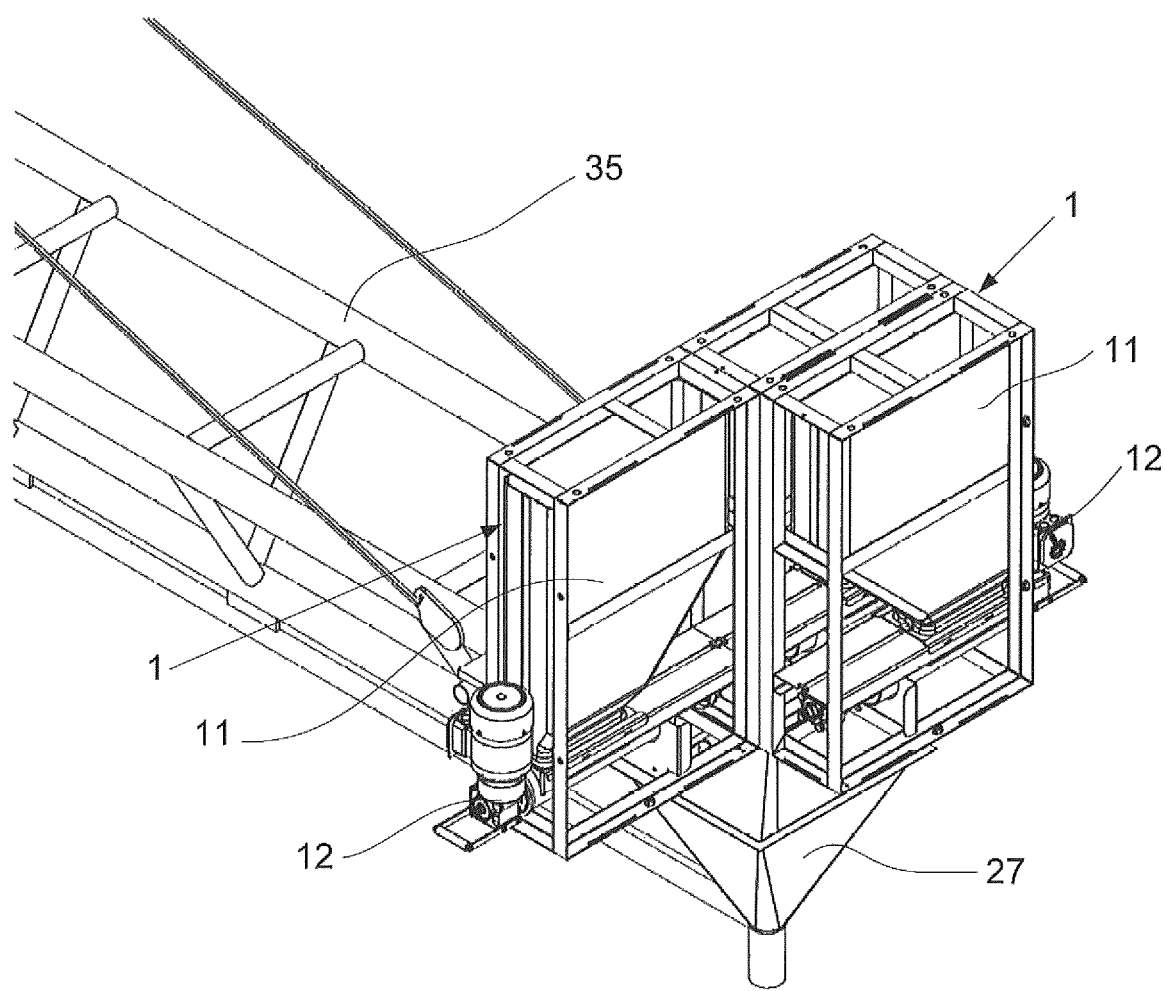
FIG. 7 is a perspective view of plurality of cassettes according to the invention, joined side by side and end face to end face and mounted on a platform.

As can be seen in FIG. 7, the animal feeding device according to the present invention may comprise a plurality of cassettes 1 that are joined as modules to each other, for the purpose of delivering different sorts of food and nutrients to one and the same manger. The cassettes may be joined side by side, such that side walls 21, 22 of the containers 11 housed therein front each other, or face to face, such that end walls 24 of containers housed therein front each other. Preferably, there are provided quick-locking means to enable easy connection and disconnection of the cassettes 1 to and from each other respectively. Under the cassettes 1 there is provided a food collector 27 into which the food from the respective container is collected before being further dropped into a manger positioned below that collector 27. The set of cassettes 1 is arranged on a platform with a lifting arrangement 35 that holds the platform with the cassettes 1 at a predetermined height above ground.

Figure 8:
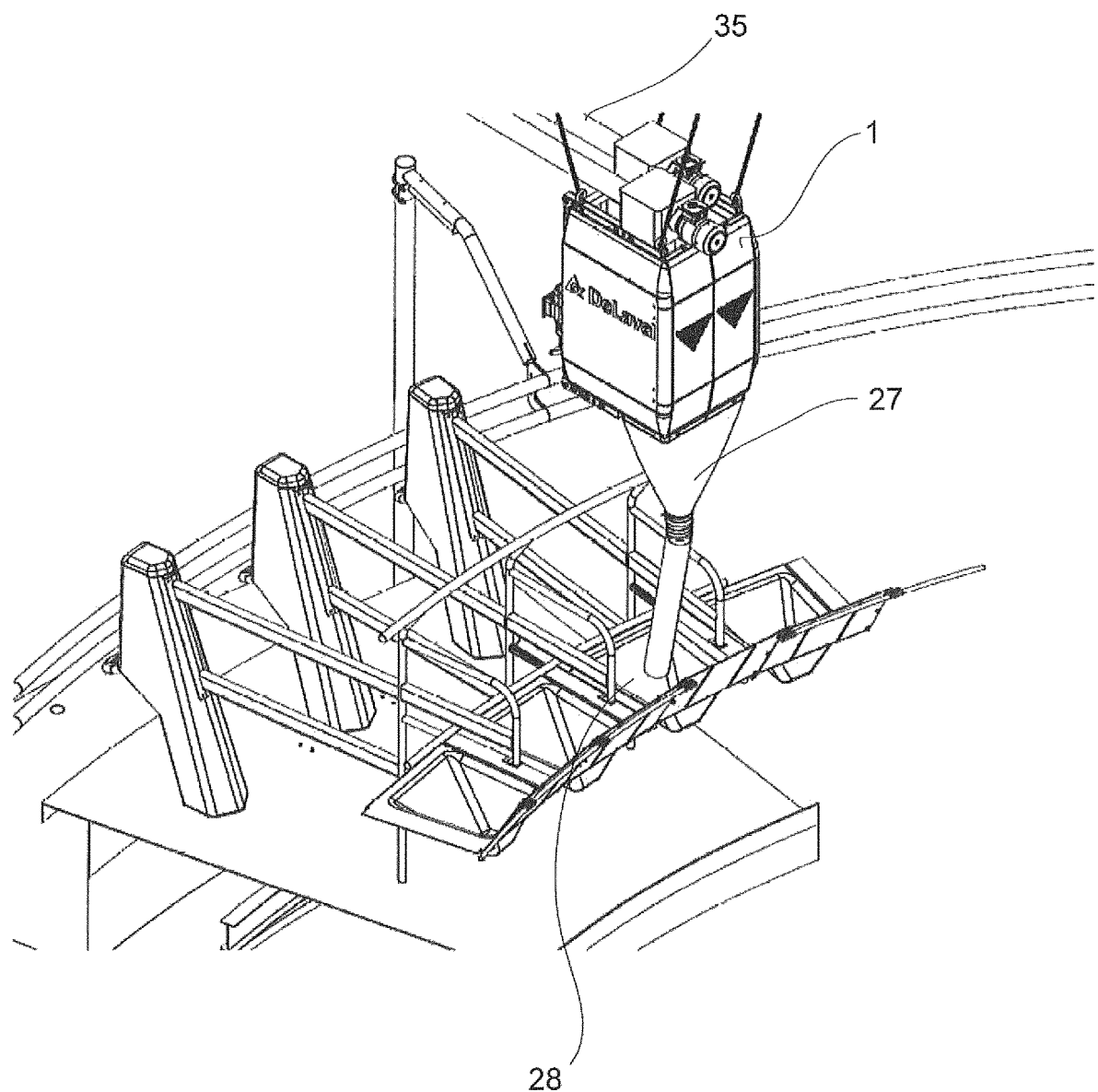
FIG. 8 is a perspective view of an animal feeding device according to the invention.
Figure 9:
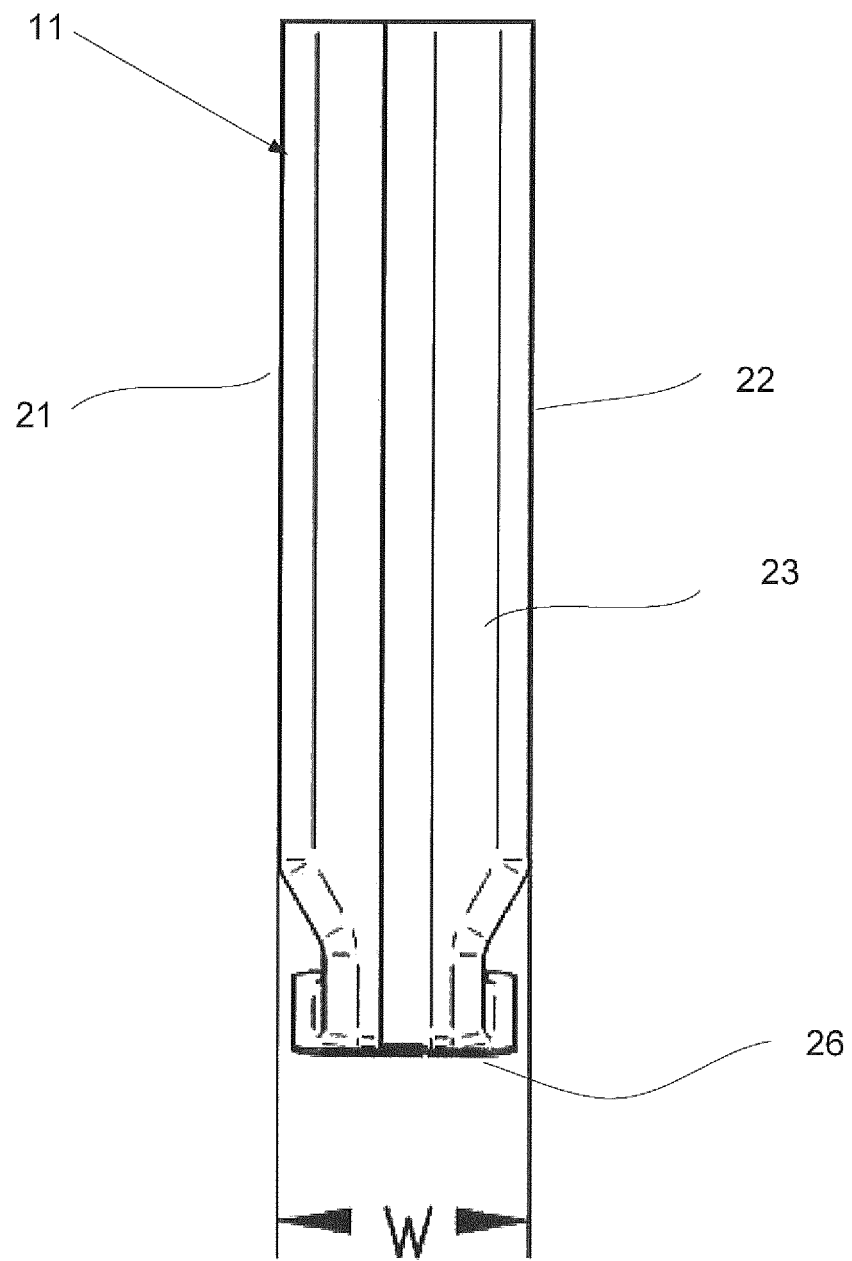
FIG. 9 is an end view of a container according to the invention.
Figure 10:
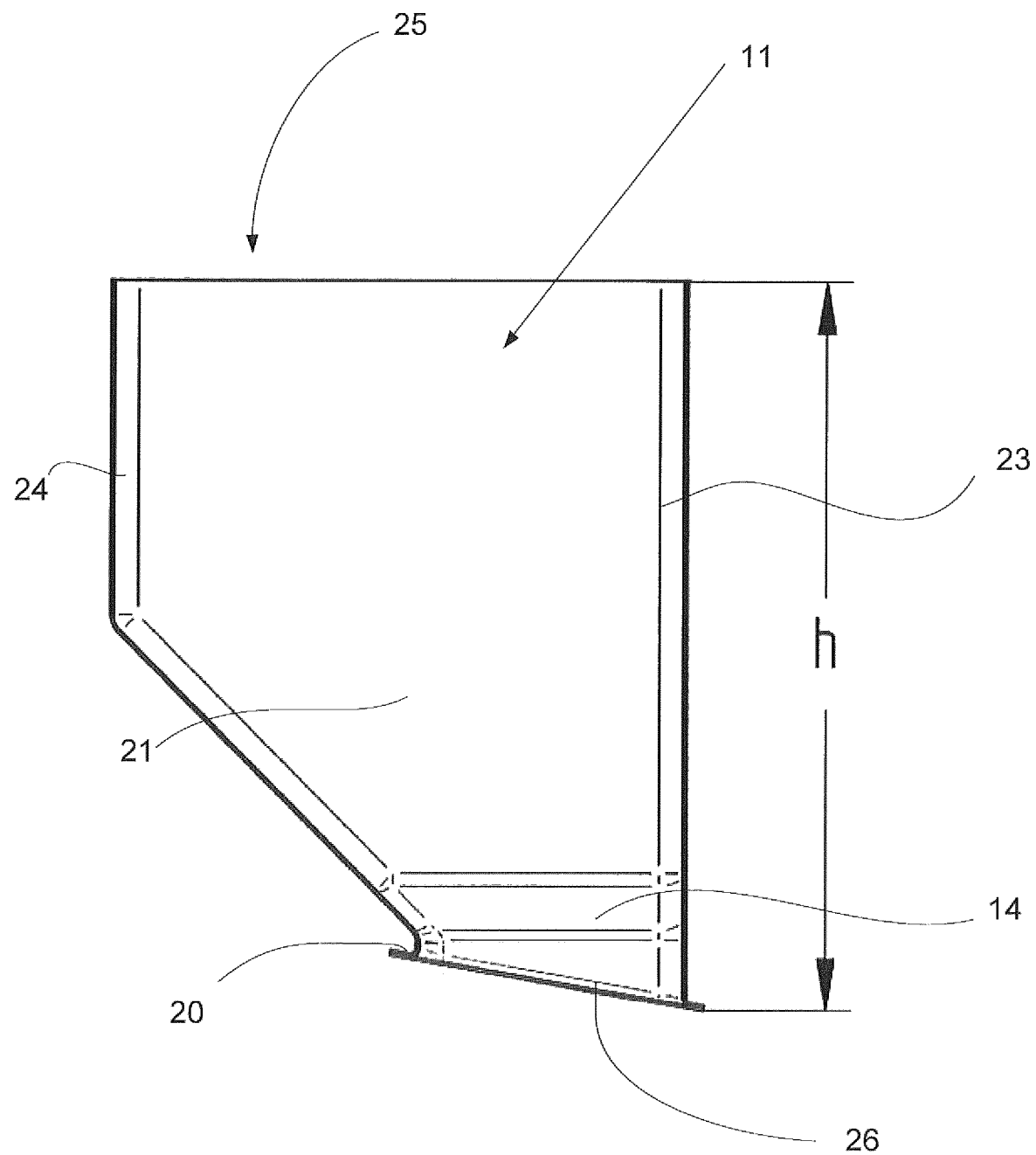
FIG. 10 is a side view of the container shown in FIG. 9.
Figure 12:
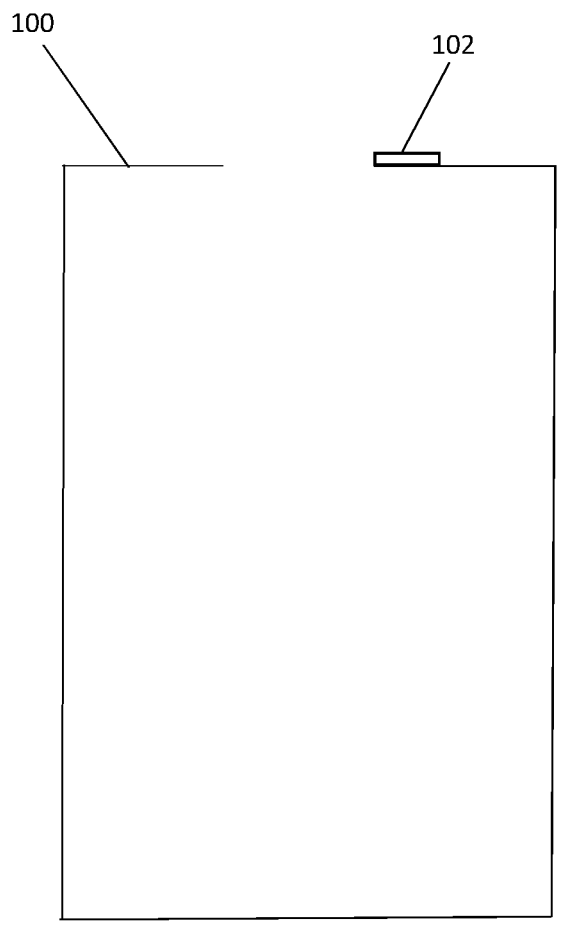
FIG. 12 is a top view of a restricted area with animal identification device in accordance with one or more embodiments.

Preferably, the animal feeding device is arranged in connection to a milking device, thereby forming part of a milking system. In connection to the milking device there is provided a restricted area 100 in which an animal will be standing while being milked, illustrated in FIG. 12. A manger is positioned in said area such that it is within reach for the animal that is being milked. Preferably, there is provided an animal identification device 102 at the entrance into said area, and preferably the animal feeding device comprises a control unit connected to the animal identification device and to a database in which there is information about what kind of food and amount of food to be served to each individual animal that can be expected to enter said area. As a response to the identification of a predetermined animal entering the area, the control unit is configured to control the operation of the food delivery device of the respective cassette, such that the right kind of food and amount of food is served to that animal. There may be load sensors or the like provided at each container, in order to sense how much food has been delivered by the food delivery device to the food collector. There may also be load sensors or the like provided in connection to the food collector to check that the collector has received the same amount of food that has left the containers. The control unit is connected to the load sensors and controls the operation of the respective food delivery device on basis of information therefrom. In FIG. 8 the milking device is only hinted, but the principles thereof may be those described hereinabove.

The animal milking system in which the animal feeding device according to the present invention is arranged may be any milking system, but according to a preferred embodiment it is a rotary parlour.

The invention claimed is:

1. An animal feeding device, comprising:
   at least one cassette including
      a frame including wall elements that define an upper compartment and a lower compartment of the frame, side wall elements of the frame defining a width of the upper compartment,
      a food container housed in the upper compartment of the frame and supported by at least one of the wall elements of the frame, the food container including a bottom portion provided with a food outlet, the food container being configured to slidably engage into the frame, and
      a food delivery device housed in the lower compartment of the frame, said food container communicating with said food delivery device through an opening of the food delivery device, the food outlet being configured to communicate with the opening of the food delivery device when the bottom portion of the food container is positioned over the opening of the food delivery device,
   wherein the food container has
      a front wall,
      an end wall having an inclination towards the bottom portion of the food container at least along a lower part thereof,
      side walls parallel in a longitudinal direction, having a constant distance therebetween in said longitudinal direction, being opposite to each other, being connected to and separated by the front wall in one end thereof, and being connected to and separated by the end wall in an opposite end thereof, the distance between respective outer surfaces of said side walls of the food container defining a width of the food container, the side walls of the food container being positioned opposite to and adjacent respective said side wall elements of the frame, and the width of the upper compartment corresponding to the width of the food container,
      a top provided with a food inlet for introduction of food into the food container, and
      an engagement system comprising a flange extending laterally from the bottom rim of the bottom portion of the container,
      the bottom portion of the food container extending from lower ends of the side walls, the front wall, and the end wall to a bottom rim which delimits the opening of the bottom portion,
   wherein the food container is configured to slidably engage into the frame.

2. The animal feeding device according to claim 1, wherein the height of the upper compartment corresponds to the height of the food container.

3. The animal feeding device according to claim 1, wherein the outer surface of said side walls of the food container are in contact with the side wall elements of the frame, such that the food container is held in position in the frame at least partly as a result of a friction force between said side walls and said side wall elements.

4. The animal feeding device according to claim 1, wherein the lower compartment has a width equal to the width of the upper compartment.

5. The animal feeding device according to claim 1, wherein the wall elements of the frame define a lateral opening into the lower compartment, which is configured to respectively enable entrance and exit of the food delivery device into and out of the lower compartment respectively.

6. The animal feeding device according to claim 1, wherein the food delivery device is configured to receive food from the food outlet provided in the bottom portion of the food container and deliver that food to a further downstream food collector positioned below the food delivery device, and
   the food delivery device defines a food delivery path which has an inclination angle of between 5° and 45° relative a horizontal plane from where the food delivery device receives food from the food container to where the food delivery device delivers food to the food collector.

7. The animal feeding device according to claim 1, wherein the frame further comprises first support surfaces by which the food container is supported.

8. The animal feeding device according to claim 1, wherein the at least one cassette comprises a plurality of cassettes that are releasably attached to each other.

9. The animal feeding device according to claim 1, further comprising:
   a platform on which the at least one cassette stands; and
   a lift that holds the platform with the at least one cassette at a predetermined height above ground.

10. The animal feeding device according to claim 1, further comprising a slideably arranged element that covers the food outlet provided at the bottom portion of the food container when the food delivery device is out of operative position and that is pushed away from a covering position by the food delivery device when the food delivery device is slid into an operative position inside the lower compartment and that automatically returns to the covering position upon removal of the food delivery device from the operative position in the lower compartment.

11. The food container according to claim 1, wherein the parallel side walls are generally flat, and the front wall is generally flat and perpendicular to the side walls.

12. The food container according to claim 1, wherein, at the bottom portion of the food container, the engagement system is configured to be engaged with a guide element of the frame configured to house the food container.

13. The food container according to claim 1, wherein the food container has a width w, which is said distance between the side walls thereof, and a maximum height, and
wherein $0.1h<w<0.5h$.

14. The food container according to claim 1, wherein the food container has a width w, which is said distance between the side walls thereof, and a maximum length l, as seen from the front wall to the end wall, and
wherein $0.1l<w<0.5l$.

15. The food container according to claim 1, wherein an inclination angle of said lower part of the end wall is in the range of 30°-60°.

16. The food container according to claim 1, wherein the bottom rim defines said food outlet and has an inclination angle in the range of 5°-45° relative a plane that is perpendicular to the plane of the front wall and perpendicular to the plane of the side walls of the food container.

17. The animal feeding device according to claim 1, wherein, in a front end of the frame, the wall elements of the frame define a lateral opening into the upper compartment, said lateral opening having a width corresponding to the width of the upper compartment and a height equal to or larger than the height of the food container, said lateral opening being configured to enable entrance and exit therethrough of the food container into and out of the upper compartment respectively.

18. The animal feeding device according to claim 17, said lateral opening into the upper compartment and a lateral opening into the lower compartment are provided on a same side of the frame.

19. The animal feeding device according to claim 9, wherein the frame further comprises first guide elements that enable the food container to be slid into the upper compartment to a position in which the food container is supported by said support surfaces.

20. The animal feeding device according to claim 10, the frame further comprises second support surfaces by which the food delivery device is supported.

21. The animal feeding device according to claim 20, wherein the frame further comprises second guide elements that enable the food delivery device to be slid into the lower compartment to a position in which the food delivery device is supported by said second support surfaces.

22. An animal milking system, comprising:
at least one milking device configured for the milking of an animal;
a food manger; and
an animal feeding device configured to fill the food manger with food, the animal feeding device comprising
at least one cassette including
a frame including wall elements that define an upper compartment and a lower compartment of the frame, and side wall elements that define a width of the upper compartment,
a food container housed in the upper compartment of the frame and supported by at least one of the wall elements of the frame, the food container including a bottom portion provided with a food outlet, the food container being configured to slidably engage into the frame,
a food delivery device housed in the lower compartment of the frame, said food container communicating with said food delivery device through an opening of the food delivery device, the food outlet being configured to communicate with the opening of the food delivery device when the bottom portion of the food container is positioned over the opening of the food delivery device,
wherein the food container has
a front wall,
an end wall having an inclination towards the bottom portion of the food container at least along a lower part thereof,
side walls parallel in a longitudinal direction, having a constant distance therebetween in said longitudinal direction, being opposite to each other, being connected to and separated by the front wall in one end thereof, and being connected to and separated by the end wall in an opposite end thereof, the distance between respective outer surfaces of said side walls of the food container defining a width of the food container, the side walls of the food container being positioned opposite to and adjacent respective said side wall elements of the frame, and the width of the upper compartment corresponding to the width of the food container,
a top provided with a food inlet for introduction of food into the food container, and
an engagement system comprising a flange extending laterally from the bottom rim of the bottom portion of the container,
the bottom portion of the food container extending from lower ends of the side walls, the front wall, and the end wall to a bottom rim which delimits the opening of the bottom portion,
wherein the food container is configured to slidably engage into the frame.

23. The animal milking system according to claim 22, further comprising:
an identification device configured to identify an animal that is in a predetermined milking position at the food manger; and
a controller that controls the operation of the food delivery device of the animal feeding device based on information from said identification device and information in a database that contains information of an amount and a type of food to be served to the animal.

24. The animal milking system according to claim 22, wherein the animal milking system is a rotary parlor.

* * * * *